US012647831B2

(12) United States Patent
Nakahira et al.

(10) Patent No.: US 12,647,831 B2
(45) Date of Patent: Jun. 2, 2026

(54) RADIO PARAMETER CONTROL METHOD, CONTROL APPARATUS, RADIO PARAMETER CONTROL SYSTEM AND PROGRAM

(71) Applicant: NTT, Inc., Tokyo (JP)

(72) Inventors: Toshiro Nakahira, Tokyo (JP);
Motoharu Sasaki, Tokyo (JP);
Takatsune Moriyama, Tokyo (JP);
Yasushi Takatori, Tokyo (JP)

(73) Assignee: NTT, Inc., Tokyo (JP)

( * ) Notice: Subject to any disclaimer, the term of this patent is extended or adjusted under 35 U.S.C. 154(b) by 306 days.

(21) Appl. No.: 18/557,547

(22) PCT Filed: May 17, 2021

(86) PCT No.: PCT/JP2021/018674
§ 371 (c)(1),
(2) Date: Oct. 26, 2023

(87) PCT Pub. No.: WO2022/244081
PCT Pub. Date: Nov. 24, 2022

(65) Prior Publication Data
US 2024/0205750 A1 Jun. 20, 2024

(51) Int. Cl.
*H04W 28/18* (2009.01)
*H04W 24/02* (2009.01)
*H04W 28/02* (2009.01)
(52) U.S. Cl.
CPC ........... *H04W 28/18* (2013.01); *H04W 24/02* (2013.01); *H04W 28/0268* (2013.01)

(58) Field of Classification Search
CPC .. H04W 28/18; H04W 24/02; H04W 28/0268
See application file for complete search history.

(56) References Cited

U.S. PATENT DOCUMENTS

2014/0256335 A1 9/2014 Kobayashi et al.
2019/0159205 A1 5/2019 Mercier et al.

FOREIGN PATENT DOCUMENTS

JP 2017103553 A 6/2017
JP 2017103558 A * 6/2017
WO WO-2013046502 A1 * 4/2013 .......... H04W 52/267

OTHER PUBLICATIONS

Abeysekera et al. (2014) "Network controlled frequency channel and bandwidth allocation scheme for IEEE 802.11a/n/ac wireless LANs: RATOP", in Proc. of IEEE PIMRC', Sep. 14, 2014.

* cited by examiner

*Primary Examiner* — Sulaiman Nooristany

(57) ABSTRACT

A radio parameter control method is performed by a control device that includes a memory and a processor, for a plurality of base stations constituting a radio network. The method includes: collecting radio environment information in the radio network and communication quality information for each communication area provided by each of the base stations; determining whether to perform radio parameter control based on the communication quality information; calculating a radio parameter for at least one of the base stations based on the radio environment information in a case where it is determined that the radio parameter control is to be performed; and setting the calculated radio parameter in said at least one of the base stations.

7 Claims, 9 Drawing Sheets

Fig. 1

CONTROL DEVICE

300

350

DATA STORAGE UNIT

310  INFORMATION COLLECTION UNIT

320  DETERMINATION UNIT

330  RADIO PARAMETER CALCULATION UNIT

340  CONTROL UNIT

Fig. 4

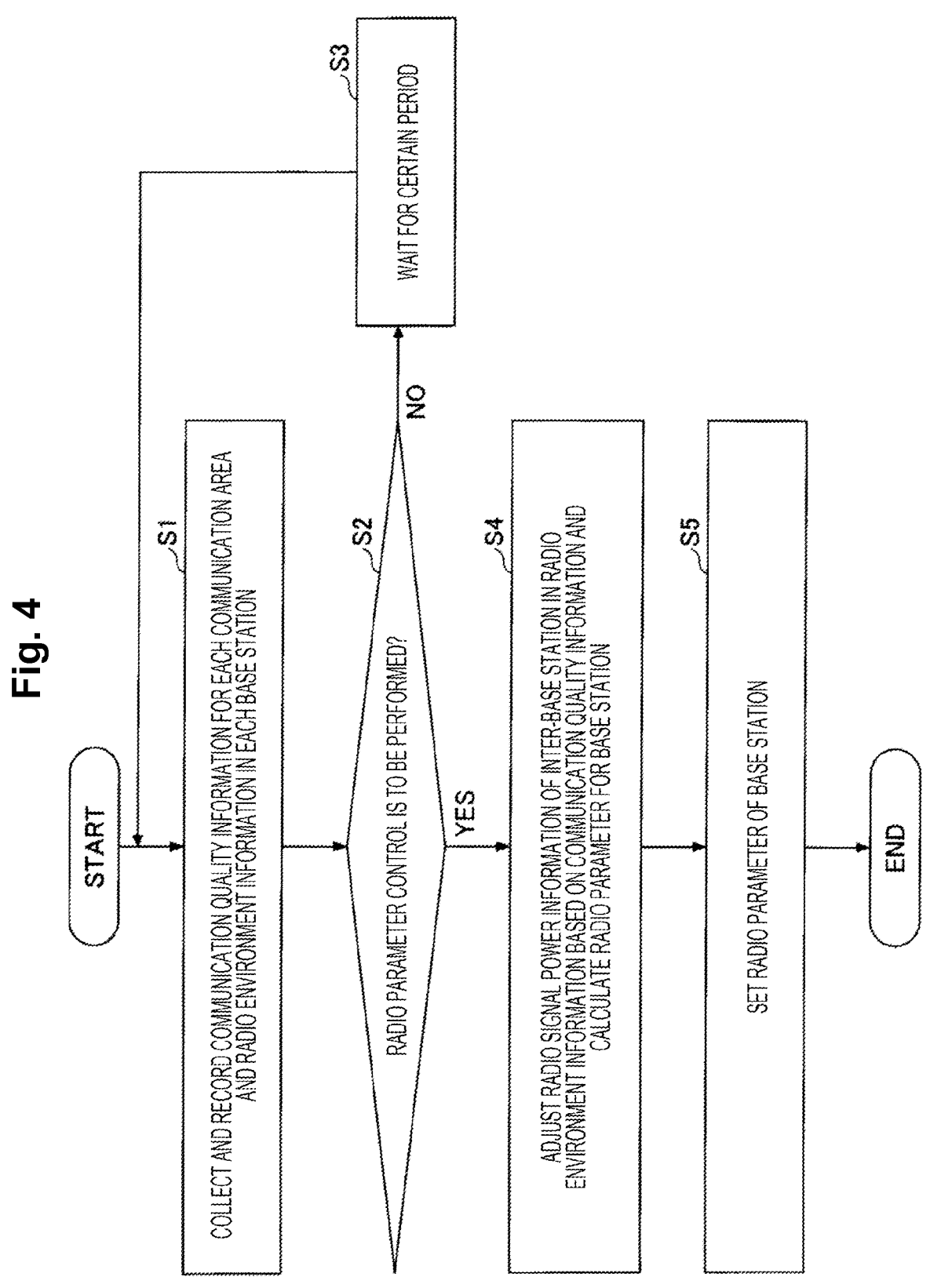

START

S1 — COLLECT AND RECORD COMMUNICATION QUALITY INFORMATION FOR EACH COMMUNICATION AREA AND RADIO ENVIRONMENT INFORMATION IN EACH BASE STATION

S2 — RADIO PARAMETER CONTROL IS TO BE PERFORMED?

NO

S3 — WAIT FOR CERTAIN PERIOD

YES

S4 — ADJUST RADIO SIGNAL POWER INFORMATION OF INTER-BASE STATION IN RADIO ENVIRONMENT INFORMATION BASED ON COMMUNICATION QUALITY INFORMATION AND CALCULATE RADIO PARAMETER FOR BASE STATION

S5 — SET RADIO PARAMETER OF BASE STATION

END

Fig. 7

RECEPTION

| | BASE STATION | 1-1 | 1-2 | 1-3 | 1-4 |
|---|---|---|---|---|---|
| TRANSMISSION | 1-1 | | −75 | −75 | −85 |
| | 1-2 | −75 | | −85 | −75 |
| | 1-3 | −75 | −85 | | −75 |
| | 1-4 | −85 | −75 | −75 | |

(−dBm)

Fig. 9

RECEPTION

| BASE STATION | 1-1 | 1-2 | 1-3 | 1-4 |
|---|---|---|---|---|
| 1-1 | | <u>−65</u> | <u>−65</u> | <u>−75</u> |
| 1-2 | −75 | | −85 | −75 |
| 1-3 | −75 | −85 | | −75 |
| 1-4 | −85 | −75 | −75 | |

TRANSMISSION (−dBm)

RADIO PARAMETER CONTROL METHOD, CONTROL APPARATUS, RADIO PARAMETER CONTROL SYSTEM AND PROGRAM

CROSS-REFERENCE TO RELATED APPLICATIONS

This application is a U.S. 371 Application of International Patent Application No. PCT/JP2021/018674, filed on 17 May 2021, the disclosure of which is hereby incorporated herein by reference in its entirety.

TECHNICAL FIELD

The present invention relates to a technology for performing radio parameter control for a base station in a radio network including a plurality of base stations.

BACKGROUND ART

In recent years, with the rapid spread of radio terminals such as smartphones and tablets, the number of users of large-capacity content by radio terminals has increased, and radio networks have been widely used.

Although elements related to provision of a radio network include various elements such as a radio communication portion such as construction and parameter setting of a radio base station (hereinafter, referred to as a base station), a network portion such as interaction among a base station, an access network, and a core network, and an upper service portion such as user authentication and a portal screen, in the present invention, attention is paid to radio parameter setting of a base station.

In general, in a radio network, a plurality of base stations are installed to have overlapping areas (which may be referred to as cells) in order to cover everywhere in the areas. Therefore, when the base stations use the same frequency channel, inter-cell interference occurs and communication quality deteriorates.

Therefore, a radio parameter design technology based on radio environment information of inter-base station and a communication status of a user has been proposed. For example, Non-Patent Literature 1 discloses a design technology of frequency channels and bandwidths of a base station for improving a user's throughput by repetitive optimization.

CITATION LIST

Non-Patent Literature

Non-Patent Literature 1: B. A. H. S. Abeysekera, M. Matsui, Y. Asai, and M. Mizoguchi, "Network controlled frequency channel and bandwidth allocation scheme for IEEE 802.11a/n/ac wireless LANs: RATOP," in Proc. of IEEE PIMRC'14, September 2014.

SUMMARY OF INVENTION

Technical Problem

The user's place, communication status, and surrounding environment change from moment to moment, and the communication status of the radio network changes every time such a change occurs. If a radio parameter is always changed according to the communication status, the calculation frequency of radio parameters increases, which leads to frequent occurrences of instantaneous interruption due to the parameter change and an increase in optimization calculation resources. In conventional technologies, it has been difficult to appropriately determine design change of a radio network to control the radio parameters.

In addition, there is inter-cell interference as one of the problems causing quality deterioration in a radio network, and it is necessary to control the radio parameters to reduce inter-cell interference from surroundings to a cell whose communication quality is deteriorated. However, it is difficult to perform such radio parameter control with conventional technologies.

That is, in conventional technologies, there has been a problem that it is difficult to appropriately control radio parameters for base stations constituting a radio network.

The present invention has been made in view of the above points, and has an object to provide a technology for appropriately controlling radio parameters for base stations constituting a radio network.

Solution to Problem

According to the disclosed technology, a radio parameter control method is provided that is performed by a control device for a plurality of base stations constituting a radio network, and includes:

an information collection step of collecting radio environment information in the radio network and communication quality information for each communication area provided by each of the base stations;

a determination step of determining whether to perform radio parameter control based on the communication quality information;

a radio parameter calculation step of calculating a radio parameter for at least one of the base stations based on the radio environment information in a case where it is determined in the determination step that the radio parameter control is to be performed; and a control step of setting the radio parameter calculated in the radio parameter calculation step in said at least one of the base stations.

Advantageous Effects of Invention

According to the disclosed technology, a technology is provided for appropriately controlling radio parameters for base stations constituting a radio network.

BRIEF DESCRIPTION OF DRAWINGS

FIG. 1 is an overall configuration diagram of a radio network in an embodiment of the present invention.

FIG. 4 is a flowchart for explaining an operation of the control device 300.

FIG. 7 is a diagram for explaining an example of radio signal power information.

FIG. 9 is a diagram for explaining an example of radio signal power information.

DESCRIPTION OF EMBODIMENTS

Hereinafter, an embodiment of the present invention (present embodiment) will be described with reference to the drawings. The embodiment described below is merely an example, and an embodiment to which the present invention is applied is not limited to the embodiment described below.

The base station in the present embodiment is, for example, a base station (access point) of a wireless LAN disclosed in Non-Patent Literature 1, but is not limited thereto. For example, the base station in the present embodiment may be a base station in a radio access technology such as 6G, 5G, LTE, or 3G. The present invention can also be applied to a multi radio system in which base stations of different radio access technologies are mixed.

System Configuration Example

Figure 1:
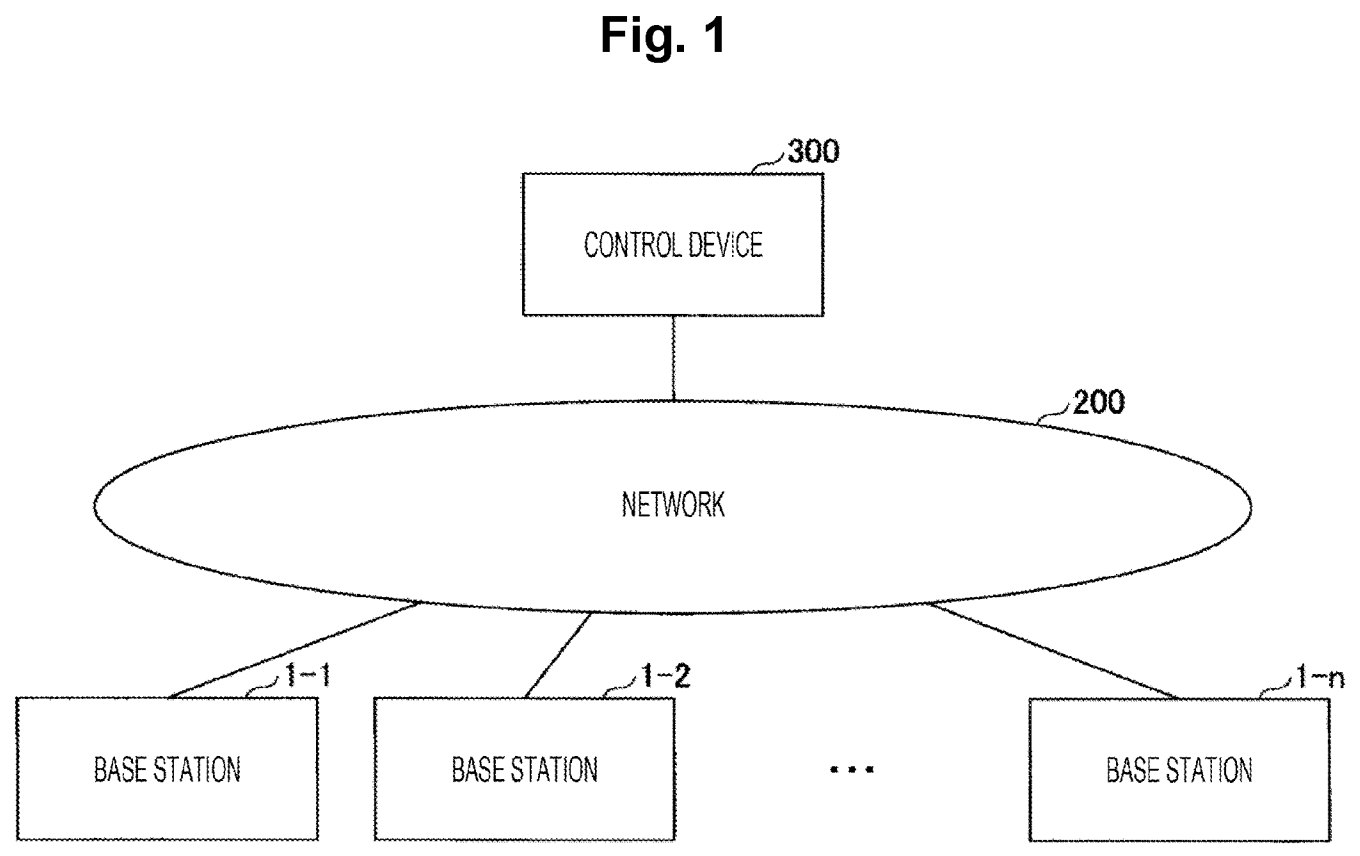

FIG. 1 illustrates an overall configuration example of a radio network (which may also be referred to as a radio parameter control system) in the present embodiment. As illustrated in FIG. 1, a plurality of base stations 1-1 to 1-$n$ are provided, and each base station is connected to a network 200 by radio or by wire. Each base station forms a communication area, and there are zero or more terminals (not illustrated) in the communication area.

The base station itself is an existing base station, and can communicate by radio with a terminal and communicate with another base station, an application server, or the like via the network 200. The network 200 is, for example, a LAN, the Internet, a core network of a mobile network, or the like.

A control device 300 is connected to the network 200. The control device 300 is a device having a function according to the present invention, calculates radio parameters of each base station by a method to be described later, and controls radio parameter setting and the like for the base stations.

Device Configuration Example

Figure 2:
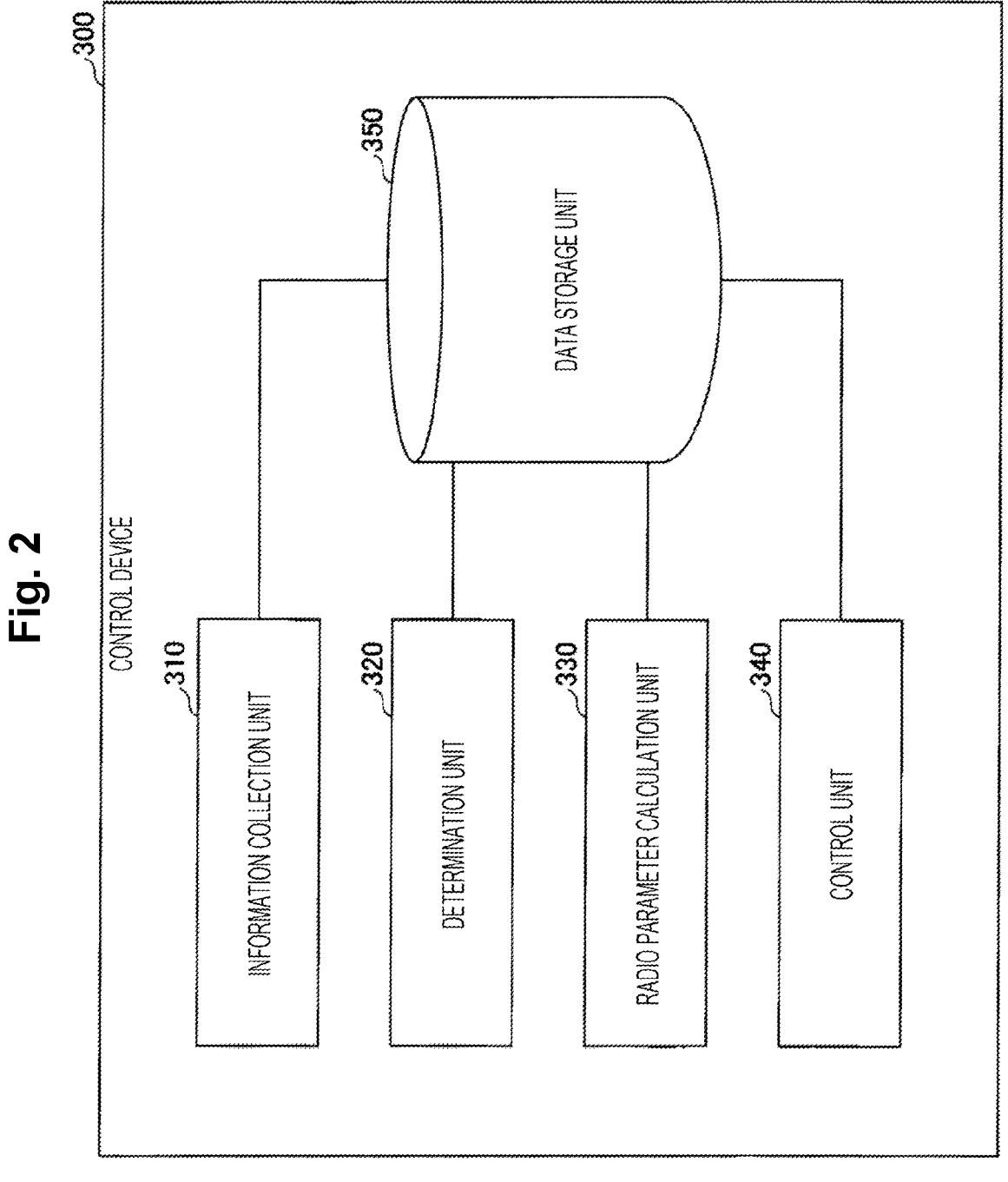
FIG. 2 is a functional configuration diagram of a control device 300.

FIG. 2 illustrates an exemplified functional configuration of the control device 300. As illustrated in FIG. 2, the control device 300 includes an information collection unit 310, a determination unit 320, a radio parameter calculation unit 330, a control unit 340, and a data storage unit 350.

The information collection unit 310 collects communication quality information of a communication area of each base station, radio environment information of each base station, and the like. The determination unit 320 determines whether to perform radio parameter control for at least one base station. The radio parameter calculation unit 330 calculates a radio parameter when the determination unit 320 determines to perform radio parameter control.

The control unit 340 sets the radio parameter calculated by the radio parameter calculation unit 330 in the corresponding base station. The data storage unit 350 stores information collected by the information collection unit 310, information necessary for operation by the determination unit 320 and the radio parameter calculation unit 330, an operation result, and the like.

The control device 300 may configured with one device (computer) or may be configured with a plurality of computers. For example, the determination unit 320 and the other functional units may be configured with separate computers.

Hardware Configuration Example

The control device 300 can be implemented by, for example, causing a computer to execute a program. This computer may be a physical computer, or may be a virtual machine in a cloud.

Specifically, the control device 300 can be implemented by executing a program corresponding to processing to be performed in the control device 300 by using hardware resources such as a central processing unit (CPU) and a memory installed in the computer. The above program is recorded in a computer-readable recording medium (such as a portable memory) so that the program can be stored and distributed. Also, the program can be provided through a network such as the Internet or an electronic mail.

Figure 3:
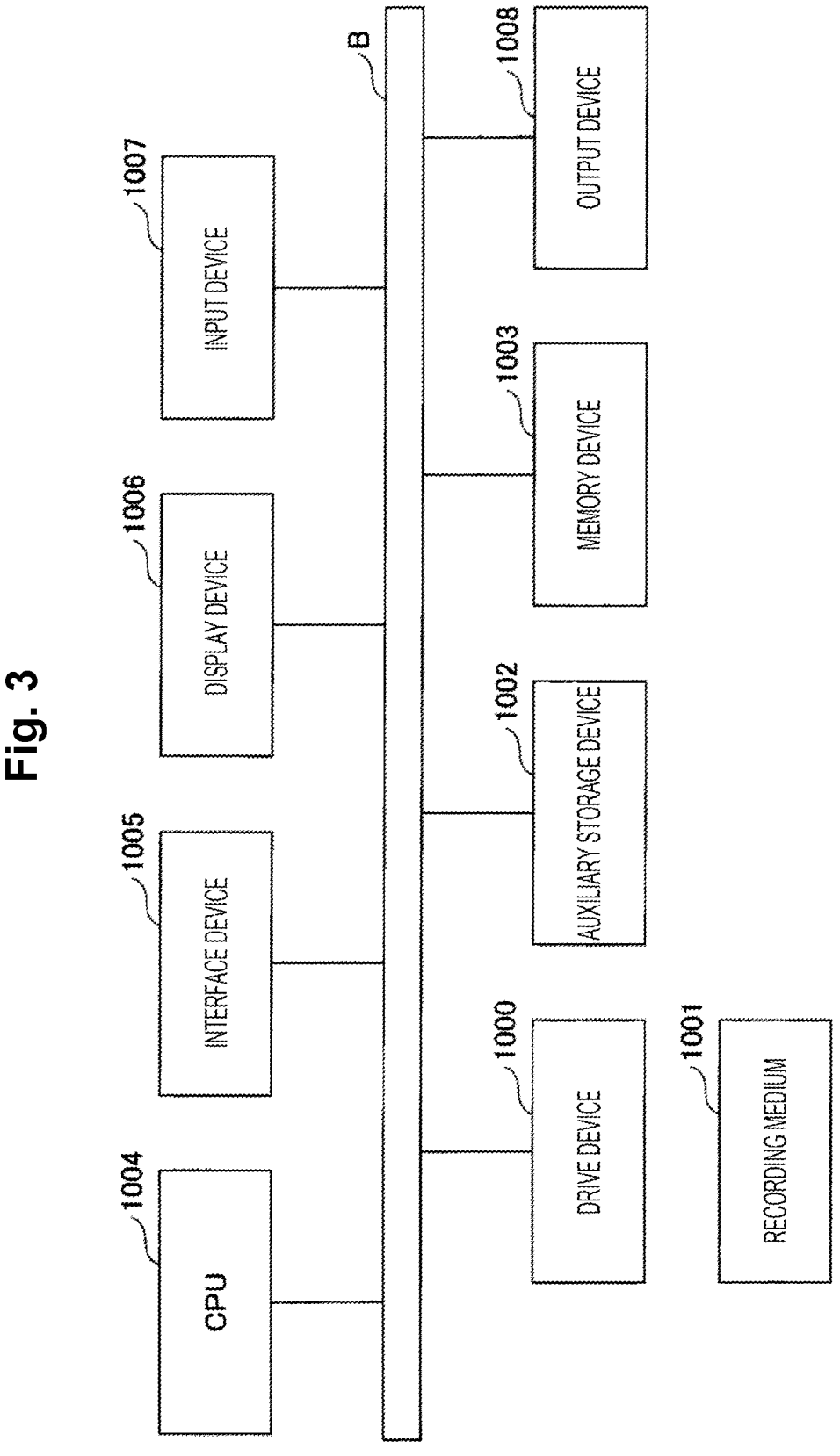
FIG. 3 is a hardware configuration diagram of a device.

FIG. 3 is a diagram illustrating a hardware configuration example of the computer. The computer in FIG. 3 includes a drive device 1000, an auxiliary storage device 1002, a memory device 1003, a CPU 1004, an interface device 1005, a display device 1006, an input device 1007, an output device 1008, and the like, which are connected to each another by a bus B.

The program for performing processing in the computer is provided through a recording medium 1001 such as a CD-ROM or a memory card, for example. When the recording medium 1001 that stores the program is set in the drive device 1000, the program is installed from the recording medium 1001 into the auxiliary storage device 1002 via the drive device 1000. However, the program is not necessarily installed through the computer readable recording medium 1001, but may be downloaded from another computer via a network. The auxiliary storage device 1002 stores the installed program, and also stores necessary files, data, and the like.

In a case where an instruction to start the program is issued, the memory device 1003 reads and stores the program from the auxiliary storage device 1002. The CPU 1004 implements a function related to the control device 300 according to the program stored in the memory device 1003. The interface device 1005 is used as an interface for connecting to a network, and functions as a transmission unit and a reception unit. The display device 1006 displays a graphical user interface (GUI) or the like according to the program. The input device 1007 is configured with a keyboard and mouse, buttons, a touch panel, or the like, and is used to input various operation instructions. The output device 1008 outputs operation results.

The "computer-readable recording medium" may include a medium that dynamically holds a program for a short time, such as a communication line in a case where the program is transmitted via a network such as the Internet or a communication line such as a telephone line, and a medium that holds the program for a certain period of time, such as a volatile memory inside a computer system.

Also, the above program may be for implementing part of the functions of the control device 300, and may be capable of implementing the functions described above upon combined with a program already recorded in a computer system. Part or all of the functions of the control device 300 may be implemented using hardware such as a programmable logic device (PLD) or a field programmable gate array (FPGA).

Operation Example

An operation example of the control device 300 in the present embodiment will be described below along the procedure of the flowchart illustrated in FIG. 4. As a premise of the operation described below, it is assumed that the data storage unit 350 of the control device 300 stores, as base station information, position information of each base station, specification information (wireless scheme, transmission power, model, capacity, and the like) of each base station, and the like. The determination unit 320 and the radio parameter calculation unit 330 to be described later can calculate a radio parameter by appropriately using the base station information, calculate communication quality information after the radio parameter control, and the like.

<S1>

In S1 (step 1), the information collection unit 310 collects communication quality information for each communication area and radio environment information in each base station from each base station, and stores the collected information in the data storage unit 350. The communication quality information is, for example, throughput, latency, and the like for each communication area (for each base station). The radio environment information is, for example, information on a frequency channel used in each base station, information on a bandwidth used in each base station, interference information in each base station, and the like. The interference information is, for example, information on reception power of a radio signal received from another base station.

<S2, S3>

In S2, the determination unit 320 decides (determines) whether to perform radio parameter control for at least one base station based on the information collected in S1. If the determination result in S2 is Yes (radio parameter control is performed), the process proceeds to S4.

If the determination in S2 is No (radio parameter control is not performed), the process proceeds to S3, the process returns to S1 after waiting for a certain period, information is collected again, and determines whether to perform radio parameter control based on the information collected in S1 is performed (S2).

The determination method in S2 is not limited to a specific method, and for example, any one of the following methods of Examples 1 to 3 can be used. Any two or more of Examples 1 to 3 may be used in combination.

Example 1

In Example 1, the determination unit 320 determines whether to perform radio parameter control based on the current communication quality information. For example, when the communication quality (for example, throughput) of at least one communication area (base station) is worse than a threshold, the determination unit 320 determines to perform the radio parameter control and the process proceeds to S4. "Worse than a threshold" means, for example, in the case of the communication quality being the throughput, "communication quality<threshold", and in the case of the communication quality being the latency, "communication quality>threshold".

After the determination result (for example, "communication quality of a certain communication area is worse than the threshold") in S2 is obtained, the process may not proceed to S4 immediately, but may proceed to S3, to perform collecting information in S1 again and perform determination in S2 repeatedly.

During this repetition, for example, in a case where the determination result that "the communication quality of at least one communication area is worse than the threshold" is continuously obtained N times, the determination unit 320 may determine to perform the radio parameter control, and the process may proceed to S4. Here, N is an integer greater than 1.

During the repetition of P times, for example, in a case where the determination result that "the communication quality of at least one communication area is worse than the threshold" is obtained N times or more, the determination unit 320 may determine to perform the radio parameter control, and the process may proceed to S4. Here, P is an integer satisfying P>N.

Example 2

In Example 2, the determination unit 320 calculates communication quality information (referred to as assumed information on communication quality) assumed in a case where the radio parameter control is applied to at least one base station based on the radio environment information, the communication quality information, and the like, compares the assumed information on communication quality with the communication quality information acquired in S1, and determines to perform the radio parameter control in a case where an evaluation value obtained by the comparison is greater than or equal to a predetermined threshold, and the process proceeds to S4.

After the determination result (for example, "the evaluation value is greater than or equal to the threshold") in S2 is obtained, the process may not proceed to S4 immediately, but may proceed to S3, to perform collecting information in S1 again and perform determination in S2 repeatedly.

During this repetition, for example, in a case where the determination result that "the evaluation value is greater than or equal to the threshold" is continuously obtained N times, the determination unit 320 may determine to perform the radio parameter control, and the process may proceed to S4. Here, N is an integer greater than 1.

During the repetition of P times, in a case where the determination result that "the evaluation value is greater than or equal to the threshold" is obtained N times or more, the determination unit 320 may determine to perform the radio parameter control, and the process may proceed to S4. Here, P is an integer satisfying P>N.

In Example 2, the radio parameter control for obtaining the assumed information on communication quality is not actually performing the radio parameter control for the base station, but calculating the radio parameter of each base station based on the current radio environment information (interference information or the like) or the like, and obtaining the assumed information on communication quality assuming that the calculated radio parameter has been set to each base station.

As a method of calculating the radio parameter in Example 2, for example, a method (RATOP algorithm) disclosed in Non-Patent Literature 1 may be used. As a method of calculating the radio parameter in Example 2, a method described in S4 described later may be used. As a method of calculating the radio parameter in Example 2, methods other than these may be used.

Regarding the evaluation value, for example, in a case where the current communication quality information (for example, average of throughput) of all of the plurality of base stations to be controlled is set as the communication quality information, and the communication quality information (for example, average of throughput) of all of the plurality of base stations to be controlled after virtual radio parameter control is set as the communication quality virtual information, the "communication quality virtual information–communication quality information" may be used as the evaluation value. The communication quality virtual information of the base station having the worst communication quality among the plurality of base stations after the virtual radio parameter control may be used as the evaluation value.

The evaluation value is not limited to the above, and any value may be used as long as the value can evaluate the degree of improvement of the communication quality virtual information with respect to the communication quality information.

Example 3

In Example 3, the determination unit 320 repeats the waiting for a certain period in S3 and the information collection in S1, determines to perform the radio parameter control when the variation in the communication quality information within a predetermined time is greater than or equal to a predetermined threshold, and the process proceeds to S4.

For example, in a case where the threshold is Th, in a case where the best value of the communication quality information within a certain time is QB and the worst value is QW, if the absolute value of QB-QW is greater than or equal to Th, it is determined that the radio parameter control is to be performed, and the process proceeds to S4.

As described above, setting the "variation" as the difference between the best value and the worst value is an example. For example, a certain reference value of the communication quality information may be determined, and in a case where the number of times the absolute value of the deviation from the reference value becoming greater than or equal to the threshold is greater than or equal to a predetermined number of times within the above time, it may be determined that the radio parameter control is to be performed, to proceed to S4.

<S4>

Next, S4 will be described. In S4, for example, the radio parameter of each base station can be calculated using the method disclosed in Non-Patent Literature 1. The radio parameter for each base station may be calculated by adjusting radio signal power information of inter-base station on a computer (that is, the control device 300). The radio signal power information of inter-base station is information indicating received power of a radio signal received from another base station in each base station, and is information included in the radio environment information collected in S1. Hereinafter, a method of calculating a radio parameter by adjusting radio signal power information of inter-base station will be described in detail.

Figure 5:
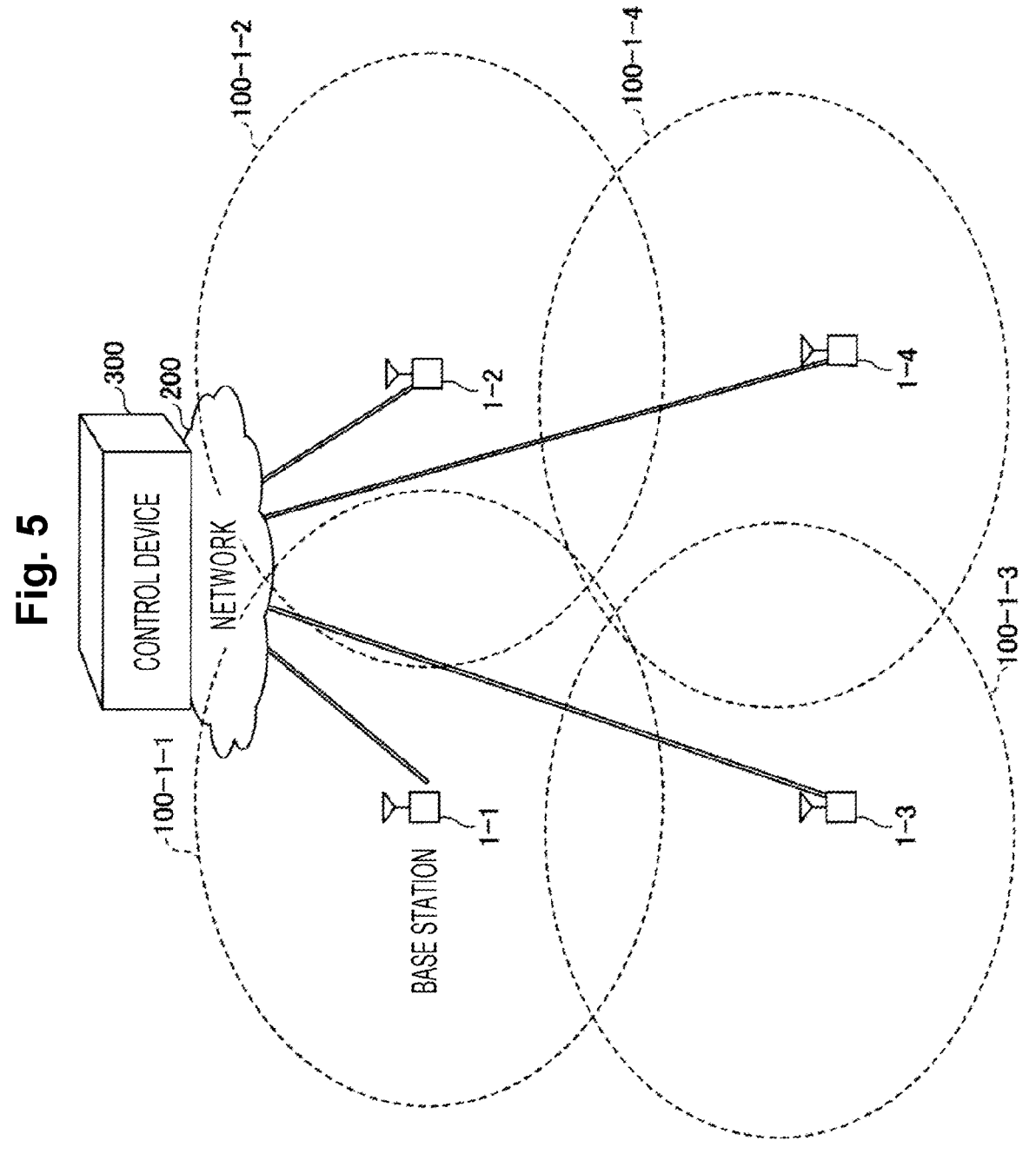
FIG. 5 is a diagram illustrating an example of a radio network.

FIG. 5 is a diagram illustrating a configuration example of a radio network assumed for describing a radio parameter calculation method.

As illustrated in FIG. 5, in this radio network, base stations 1-1 to 1-4 exist as base stations to be controlled by the control device 300, and areas 100-1-1 to 100-1-4 exist as respective communication areas. Each base station is connected to the network 200.

Figure 6:
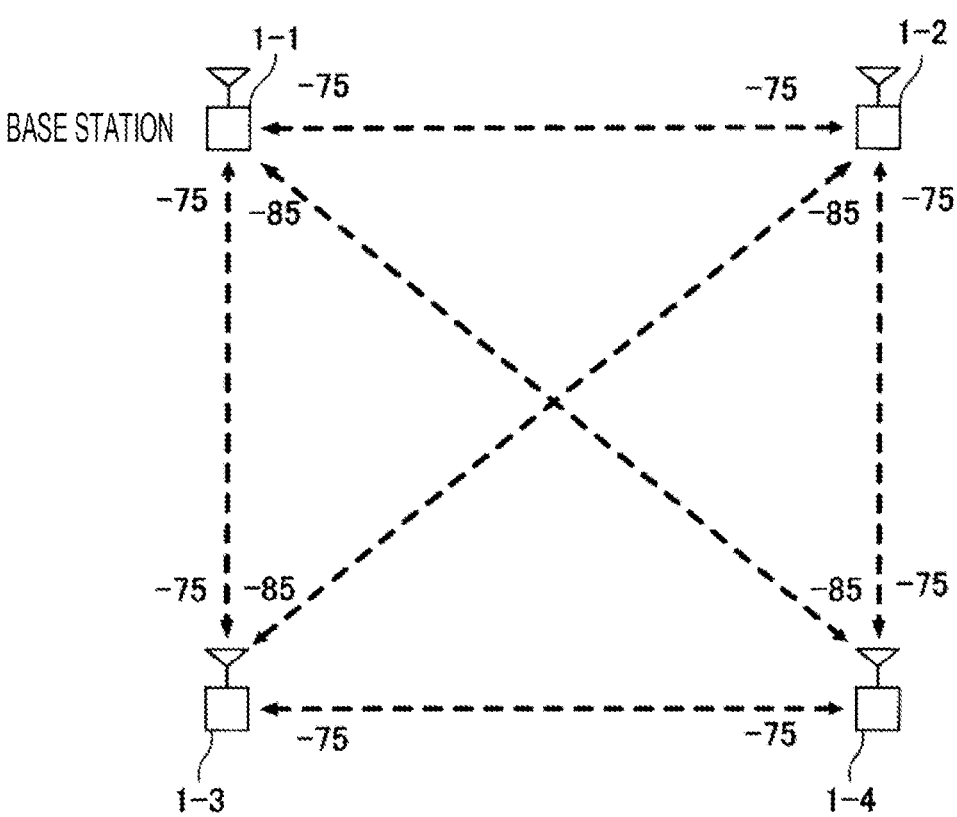
FIG. 6 is a diagram for explaining an example of radio signal power information.

FIGS. 6 and 7 illustrate examples of radio signal power information in the configuration example illustrated in FIG. 5. FIGS. 6 and 7 illustrate the same information in different formats. FIGS. 6 and 7 illustrate that, for example, the base station 1-4 receives radio signals with intensities of −85 dBm, −75 dBm, and −75 dBm from the base station 1-1, the base station 1-2, and the base station 1-3, respectively.

For example, it is assumed that the radio signal power information illustrated in FIG. 7 is stored in the data storage unit 350 at the time of the radio parameter calculation processing in S4. In S4, the radio parameter calculation unit 330 reads the radio signal power information from the data storage unit 350.

Here, assuming that a decrease in the communication quality in the communication area of the base station 1-1 is detected based on the communication quality information collected in S1, the radio parameter calculation unit 330 adjusts the radio signal power information such that the radio signal power information having the base station 1-1 as the transmission source becomes high. This adjustment is not to actually adjust the base station 1-1 but to adjust information on the computer.

Figure 8:
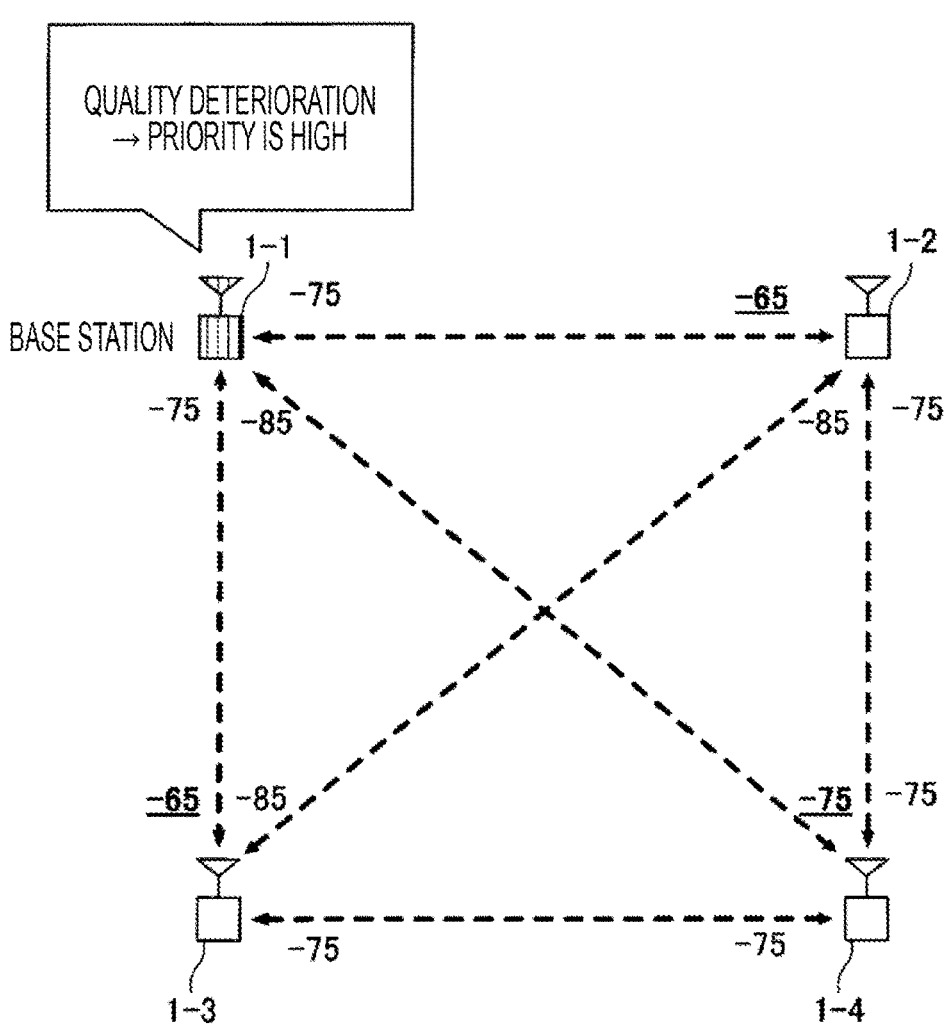
FIG. 8 is a diagram for explaining an example of radio signal power information.

Examples of the adjusted radio signal power information are illustrated in FIGS. 8 and 9. As illustrated in FIGS. 8 and 9, in this example, the power information is adjusted so as to be higher by 10 dBm in each of the base station 1-2, the base station 1-3, and the base station 1-4 on the reception side.

The radio parameter calculation unit 330 calculates a radio parameter (for example, a frequency channel used by the base station) based on the adjusted power information. As described above, when the radio parameter is calculated based on certain radio signal power information, the technology disclosed in Non-Patent Literature 1 may be used, or an existing technology other than the technology disclosed in Non-Patent Literature 1 may be used. In any technology, it is assumed that the radio parameters are adjusted to reduce the interference with the base station in which the interference from the adjacent base station is increased by performing the power information adjustment.

By adjusting the power information, for example, interference from the base station 1-1 that has not been an interference target for the base station 1-4 is more strongly detected, and even in a case where the same frequency channel as that of the base station 1-1 is used by the radio parameter control before the adjustment, it is considered that another frequency channel is used by the radio parameter control after the adjustment.

In the above example, in the adjustment of the power information, adjustment is performed to increase the power information on a reception side having as a transmission source a base station in which the degradation of the communication quality is detected, but this is an example. For example, adjustment may be performed to reduce the power information on the reception side having as transmission sources the base stations 1-2 and 1-3 adjacent to the base station 1-1 in which the deterioration in the communication quality is detected. As a result, for example, in the base station 1-1 in which the degradation of the communication quality is detected, the signals from the base stations 1-2 and 1-3 that have been interfered before the adjustment are not interfered, and as a result, the frequency channel of the base station 1-1 in which the degradation of the communication quality is detected is changed.

<S5>

In S5, the control unit 340 sets the radio parameter calculated in S4 in at least one corresponding base station.

Effects of Embodiment

According to the disclosed technology, it is possible to appropriately control a radio parameter for base stations constituting a radio network. More specifically, it is possible to easily determine whether to change the design of the radio network, and to perform efficient control. In addition, it is possible to perform radio parameter setting for reducing inter-cell interference from the surroundings with respect to a cell whose communication quality has deteriorated by simple processing.

Summary of Embodiment

The present specification discloses at least the radio parameter control method, the control device, the radio parameter control system, and the program according to the following clauses.

Clause 1

A radio parameter control method performed by a control device for a plurality of base stations constituting a radio network, the radio parameter control method including:
  an information collection step of collecting radio environment information in the radio network and communication quality information for each communication area provided by each of the base stations;
  a determination step of determining whether to perform radio parameter control based on the communication quality information;
  a radio parameter calculation step of calculating a radio parameter for at least one of the base stations based on the radio environment information in a case where it is determined in the determination step that the radio parameter control is to be performed; and
  a control step of setting the radio parameter calculated in the radio parameter calculation step in said at least one of the base stations.

Clause 2

The radio parameter control method according to Clause 1,
  in which, in the determination step, the control device calculates assumed information on communication quality assumed in a case where the radio parameter control is applied to at least one of the base stations, compares the assumed information on communication quality with communication quality information that has been actually collected, and determines whether to perform the radio parameter control.

Clause 3

The radio parameter control method according to Clause 1 or 2,
  in which, in the determination step, the control device determines to perform the radio parameter control when variation in the communication quality information within a predetermined time is greater than or equal to a threshold.

Clause 4

The radio parameter control method according to any one of Clauses 1 to 3,
  in which, in the radio parameter calculation step, the control device
  adjusts radio signal power information of inter-base station in the radio environment information, and calculates the radio parameter with respect to at least one of the base stations based on the radio signal power information after adjustment.

Clause 5

The radio parameter control method according to Clause 4,
  in which the control device
  adjusts the radio signal power information on a reception side having as a transmission source a base station of the base stations in which the communication quality is deteriorated, based on the communication quality information.

Clause 6

A control device for performing radio parameter control on a plurality of base stations constituting a radio network, the control device including:
  an information collection unit that collects radio environment information in the radio network and communication quality information for each communication area provided by each of the base stations;
  a determination unit that determines whether to perform radio parameter control based on the communication quality information;
  a radio parameter calculation unit that calculates a radio parameter for at least one of the base stations based on the radio environment information in a case where it is determined by the determination unit that the radio parameter control is to be performed; and
  a control unit that sets the radio parameter calculated by the radio parameter calculation unit in said at least one of the base stations.

Clause 7

A radio parameter control system including the control device according to Clause 6, and the plurality of base stations.

Clause 8

A program for causing a computer to function as each unit of the control device according to Clause 6.

Although the present embodiment has been described above, the present invention is not limited to such a specific embodiment, and various modifications and changes can be made within the scope of the present invention disclosed in the claims.

REFERENCE SIGNS LIST

1-1 to 1-$n$ Base station
100 Area
200 Network
300 Control device
310 Information collection unit
320 Determination unit
330 Radio parameter calculation unit
340 Control unit
350 Data storage unit
1000 Drive device
1001 Recording medium
1002 Auxiliary storage device
1003 Memory device 1004 CPU
1005 Interface device
1006 Display device
1007 Input device

The invention claimed is:

1. A radio parameter control method performed by a control device that includes a memory and a processor, for a plurality of base stations constituting a radio network, the radio parameter control method comprising:

collecting radio environment information in the radio network and communication quality information for each communication area provided by one or more base stations of the plurality of base stations;

determining, based on the collected communication quality information and a predetermined threshold describing the minimal quality needed to be provided by the radio network, whether to proceed with operations of calculating and setting a radio parameter in the one or more base stations of the plurality of base stations, wherein the determining whether to proceed with the operations of calculating and setting the radio parameter further comprises:

calculating predicted information on communication quality as predicted when the operations of calculating and setting a radio parameter are performed on an at least one of the plurality of base stations, and comparing the predicted information on the communication quality with communication quality information that has been actually collected;

calculating the radio parameter for said at least one of the plurality of base stations based on the radio environment information in a case where it is determined to proceed with the operations of calculating and setting the radio parameter; and setting the calculated radio parameter in said at least one of the plurality of base stations.

2. The radio parameter control method according to claim 1, wherein the determining whether to proceed with the operations of calculating and setting the radio parameter further comprises:

determining to proceed with the operations of calculating and setting the radio parameter when variation in the communication quality information within a predetermined time is greater than or equal to a threshold.

3. The radio parameter control method according to claim 1, wherein the calculating further comprises adjusting radio signal power information of inter-base station in the radio environment information, and calculating the radio parameter with respect to at least one of the one or more base stations of the plurality of base stations based on the adjusted radio signal power information.

4. The radio parameter control method according to claim 3, wherein the adjusting further comprises adjusting, based on the communication quality information, the radio signal power information of a receiver of a radio signal from a base station of the plurality of base stations as a radio transmitter where communication quality is deteriorated.

5. A control device for performing radio parameter control on a plurality of base stations constituting a radio network, the control device comprising:

a memory; and a processor configured to execute operations comprising:

collecting radio environment information in the radio network and communication quality information for each communication area provided by one or more base stations of the plurality of base stations;

determining, based on the collected communication quality information and a predetermined threshold describing the minimal quality needed to be provided by the radio network, whether to proceed with calculating and setting a radio parameter in the one or more base stations of the plurality of base stations, wherein the determining whether to proceed with the operations of calculating and setting the radio parameter further comprises:

calculating predicted information on communication quality as predicted when the operations of calculating and setting a radio parameter are performed on an at least one of the plurality of base stations, and comparing the predicted information on the communication quality with communication quality information that has been actually collected;

calculating the radio parameter for said at least one of the plurality of base stations based on the radio environment information in a case where it is determined to proceed with the operations of calculating and setting the radio parameter; and setting the calculated radio parameter in said at least one of the plurality of base stations.

6. A radio parameter control system comprising:

the control device according to claim 5, and the plurality of base stations according to claim 5.

7. A non-transitory computer-readable recording medium having computer-readable instructions stored thereon, which, when executed, cause a computer to function as the control device according to claim 5.

* * * * *